(12) United States Patent
Gyllenskog et al.

(10) Patent No.: US 8,996,907 B2
(45) Date of Patent: Mar. 31, 2015

(54) DETERMINING LOCATION OF ERROR DETECTION DATA

(71) Applicant: Micron Technology, Inc., Boise, ID (US)

(72) Inventors: Christian M. Gyllenskog, Meridian, ID (US); Phil W. Lee, Boise, ID (US); Steven R. Narum, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/050,774

(22) Filed: Oct. 10, 2013

(65) Prior Publication Data

US 2014/0149804 A1 May 29, 2014

Related U.S. Application Data

(62) Division of application No. 13/006,240, filed on Jan. 13, 2011, now Pat. No. 8,578,208.

(51) Int. Cl.
*G06F 11/00* (2006.01)
*G06F 11/07* (2006.01)
*G06F 11/10* (2006.01)

(52) U.S. Cl.
CPC ........ *G06F 11/0787* (2013.01); *G06F 11/1044* (2013.01); *G06F 11/108* (2013.01)
USPC ........................................ 714/6.13; 714/6.24

(58) Field of Classification Search
CPC ...................................................... G06F 11/108
USPC ................................................ 714/6.13, 6.24
See application file for complete search history.

(56) References Cited

U.S. PATENT DOCUMENTS

| | | | |
|---|---|---|---|
| 5,499,337 A | 3/1996 | Gordon | |
| 5,586,248 A | 12/1996 | Alexander et al. | |
| 5,913,927 A | 6/1999 | Nagaraj et al. | |
| 7,464,289 B2 | 12/2008 | Hung | |
| 7,529,969 B1 | 5/2009 | Patel et al. | |
| 7,752,489 B2 | 7/2010 | Deenadhayalan et al. | |
| 7,779,335 B2 | 8/2010 | Forhan et al. | |
| 8,156,368 B2 | 4/2012 | Chambliss | |
| 8,386,841 B1 | 2/2013 | Renade | |
| 2002/0185337 A1* | 12/2002 | Miura et al. | 185/11 |
| 2005/0144516 A1* | 6/2005 | Gonzalez et al. | 714/8 |
| 2006/0107097 A1 | 5/2006 | Zohar et al. | |
| 2007/0055905 A1 | 3/2007 | Chou et al. | |
| 2007/0058410 A1* | 3/2007 | Rajan | 365/63 |
| 2009/0059695 A1* | 3/2009 | Kim et al. | 365/200 |

(Continued)

OTHER PUBLICATIONS

Nitin Agrawal, et al., Design Tradeoffs for SSD Performance, Microsoft Research, Silicon Valley University of Wisconsin-Madison, Proceedings of the USENIX Technical Conference, Jun. 2008, (http://research.microsoft.com/pubs/63596/USENIX-08SSD.pdf), 14 pgs.

*Primary Examiner* — Yolanda L Wilson
(74) *Attorney, Agent, or Firm* — Brooks, Cameron & Huebsch, PLLC

(57) ABSTRACT

Methods, devices, and systems for determining location of error detection data are described. One method for operating a memory unit having a bad group of memory cells includes determining a location of where to store error detection data for data to be stored across a plurality of memory units, including the memory unit having the bad group, based at least partially on a location of the bad group and storing the error detection data in the determined location.

17 Claims, 5 Drawing Sheets

(56) References Cited

U.S. PATENT DOCUMENTS

| | | |
|---|---|---|
| 2009/0144497 A1 | 6/2009 | Withers |
| 2009/0164696 A1 | 6/2009 | Allen et al. |
| 2009/0238005 A1 | 9/2009 | You |
| 2009/0248964 A1* | 10/2009 | Yano et al. .................. 711/103 |
| 2010/0005282 A1 | 1/2010 | Smith et al. |
| 2010/0008144 A1 | 1/2010 | Lee |
| 2010/0162088 A1 | 6/2010 | Tsai et al. |
| 2011/0066793 A1* | 3/2011 | Burd .......................... 711/103 |

* cited by examiner

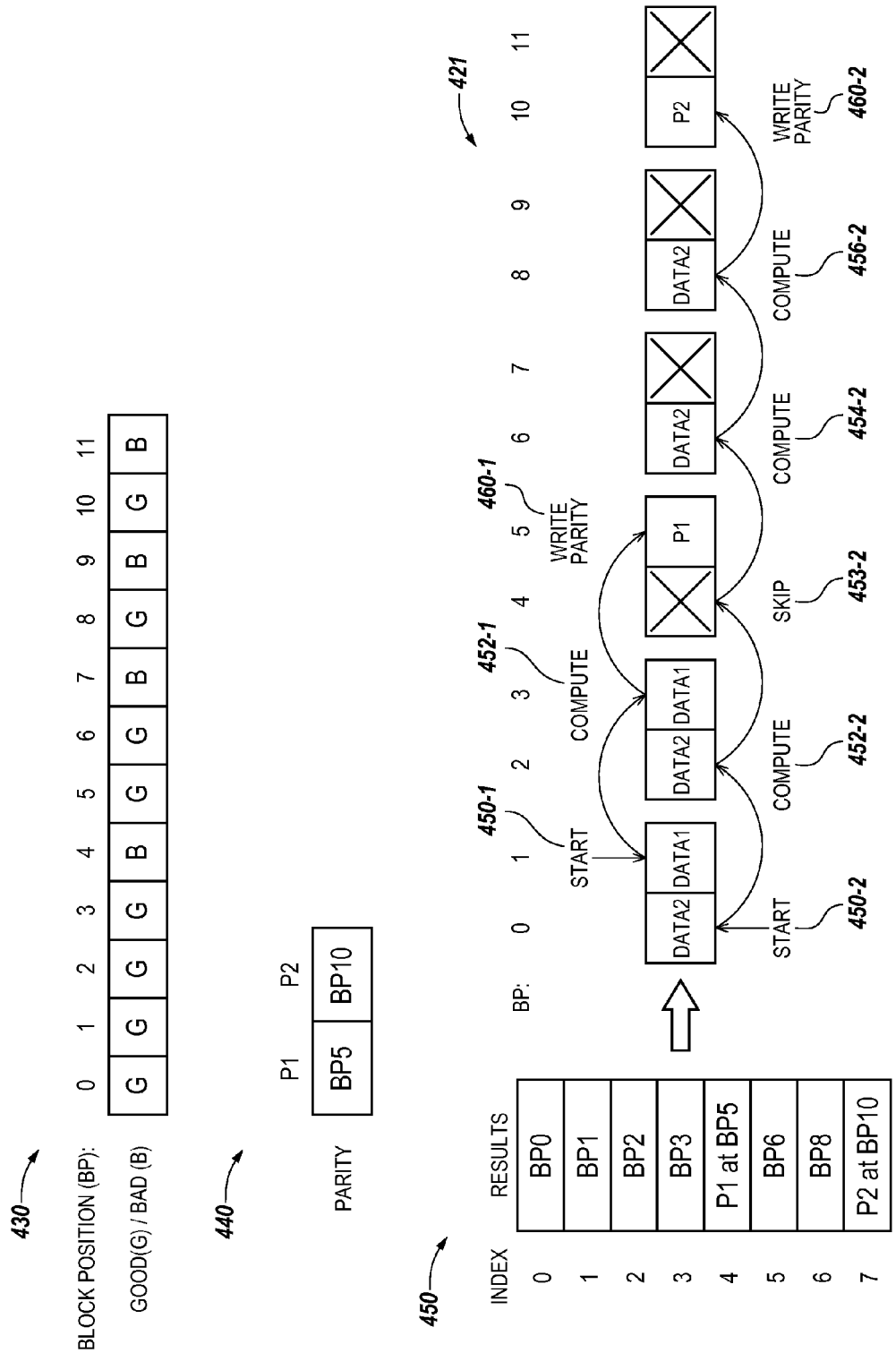

US 8,996,907 B2

DETERMINING LOCATION OF ERROR DETECTION DATA

PRIORITY APPLICATION INFORMATION

This application is a divisional of U.S. application Ser. No. 13/006,240, filed Jan. 13, 2013, the specification of which is incorporated herein by reference.

TECHNICAL FIELD

The present disclosure relates generally to semiconductor memory devices, methods, and systems, and more particularly, to methods, devices, and systems for determining location of error detection data, such as parity data.

BACKGROUND

Memory devices are typically provided as internal, semiconductor, integrated circuits in computers or other electronic devices. There are many different types of memory including volatile and non-volatile memory. Volatile memory can require power to maintain its data (e.g., information) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), phase change random access memory (PCRAM), resistive random access memory (RRAM), and magnetic random access memory (MRAM), such as spin torque transfer random access memory (STT RAM), among others.

Memory devices can be combined together to form a solid state drive (SSD). A solid state drive can include non-volatile memory (e.g., NAND flash memory and NOR flash memory), and/or can include volatile memory (e.g., DRAM and SRAM), among various other types of non-volatile and volatile memory. An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices (e.g., a number of memory chips or a number of multi-chip packages). As used herein, "a number of" something can refer to one or more of such things (e.g., a number of memory devices can refer to one or more memory devices). As one of ordinary skill in the art will appreciate, a memory chip can include a number of memory units (e.g., a number of dies or logical units (LUNs)). Each die can include a number of memory arrays and peripheral circuitry thereon.

The memory arrays can be divided into a number of "planes" (e.g., two planes, four planes, etc.), with each plane including a number of physical blocks of memory cells. In multi-plane page programming operations, user data along with corresponding parity data can be "striped" across a number of different memory units of a memory system. These parity stripes can include groups of blocks from a plurality of memory units with each group having a parity block associated therewith. However, various previous approaches utilizing parity stripes have drawbacks such as unnecessarily reducing available memory capacity, among other drawbacks.

BRIEF DESCRIPTION OF THE DRAWINGS

FIG. 4B illustrates a number of data structures associated with determining parity location for the parity stripe shown in FIG. 4A in accordance with one or more embodiments of the present disclosure.

DETAILED DESCRIPTION

Figure 1:
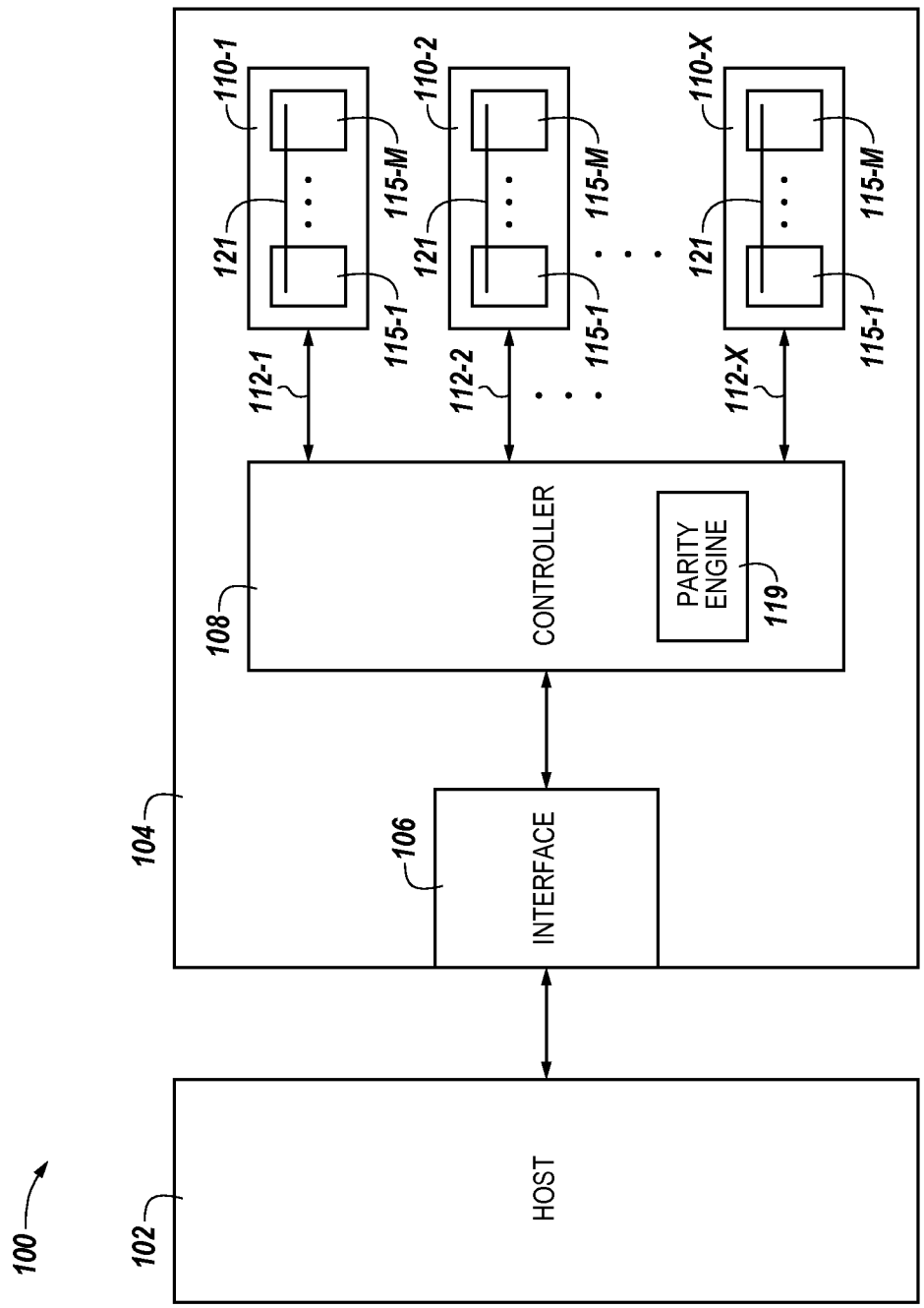
FIG. 1 is a block diagram of a computing system including at least one memory system in accordance with one or more embodiments of the present disclosure.

The present disclosure includes methods and systems for determining location of error detection data. One method for operating a memory unit having a bad group of memory cells includes determining a location of where to store error detection data for data to be stored across a plurality of memory units, including the memory unit having the bad group, based at least partially on a location of the bad group and storing the error detection data in the determined location.

Embodiments of the present disclosure can provide various benefits such as preventing loss of data due to the possible failure of one or more memory devices, memory units, and/or blocks within a memory system, among other benefits. As an example, one or more embodiments can provide a parity stripe in which valid data is written at a position within the stripe that is located after one or more parity blocks of the stripe.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N," "B," "X," and "M," particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 115 may reference element "15" in FIG. 1, and a similar element may be referenced as 215 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 is a block diagram of a computing system 100 including at least one memory system 104 in accordance with one or more embodiments of the present disclosure. As one example, the memory system 104 can be a solid state drive (SSD). The memory system 104 can include a host interface 106, a memory controller 108 (e.g., memory control circuitry, firmware, and/or software), and one or more memory devices 110-1, 110-2, . . . , 110-X coupled to the controller 108 via respective channels 112-1, 112-2, . . . , 112-X. Embodiments are not limited to a particular number of memory devices 110-1, 110-2, . . . , 110-X or channels 112-1, 112-2, . . . , 112-X. For instance, the number of channels of system 100 can be 4, 8, 16, 32, etc. In one or more embodiments, the number of channels may not be the same as the number of memory devices 110-1, 110-2, . . . , 110-X. For example, one or more of the channels 112-1, 112-2, . . . , 112-X can correspond to more or less than one memory device 110-1, 110-2, . . . , 110-X.

As illustrated in FIG. 1, the memory devices 110-1, 110-2, . . . , 110-X can include a number of memory units 115-1, . . . , 115-M providing a storage volume for the memory system 104. In one or more embodiments, the memory devices 110-1, 110-2, . . . , 110-X can be "chips" or multi-chip packages and the memory units 115-1, . . . , 115-M can be dies, which can be referred to as logical units (LUNs). As an example, the memory units 115-1, . . . , 115-M can be NAND memory units including multiple groups (e.g., blocks) of non-volatile multilevel memory cells. In one or more embodiments, a physical block refers to a group of memory cells that are erasable together as a unit. The memory devices 110-1, 110-2, . . . , 110-X can include receiving circuitry (not shown) configured to receive and process signals (e.g., data signals) from the controller 108 and can transfer those signals to other internal circuitry (not shown) of the memory devices 110-1, 110-2, . . . , 110-X.

The host interface 106 can be used to communicate information between the memory system 104 and another device such as a host 102. Host 102 can include a memory access device, such as a processor, for example. One of ordinary skill in the art will appreciate that "a processor" can intend one or more processors, such as a parallel processing system, a number of coprocessors, etc. Examples of hosts 102 can include laptop computers, personal computers, digital cameras, digital recording and playback devices, mobile telephones, PDAs, memory card readers, and interface hubs, among other host systems. The host interface 106 can be in the form of a standardized interface. For example, when the memory system 104 is used for data storage in a computing system 100, the physical host interface 106 can be a serial advanced technology attachment (SATA), peripheral component interconnect express (PCIe), or a universal serial bus (USB), among other connectors and interfaces. In general, however, host interface 106 can provide an interface for passing control, address, data, and other signals between the memory system 104 and the host.

The channels 112-1, 112-2, . . . , 112-X can each include one or more buses (e.g., an address bus and/or data bus) having various types of bus structures including, but not limited to, bus structures related to Open NAND Flash Interface (ONFI), Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In one or more embodiments, the memory controller 108 can be an application specific integrated circuit (ASIC) coupled to a printed circuit board including the physical host interface 106 and memory devices 110-1, 110-2, . . . 110-X. In one or more embodiments, the memory controller 108 includes an error detection engine, such as a parity engine 119, and can be configured to determine a location of error detection data, such as parity data, in accordance with one or more embodiments described herein, as well as to perform other memory operations as will be appreciated by those skilled in the art.

As illustrated in FIG. 1, the memory devices 110-1, 110-2, . . . 110-X can include a parity stripe 121 associated therewith. In operation, user data to be written to the memory devices 110-1, 110-2, . . . , 110-X can be striped across the planes of multiple memory units 115-1, . . . , 115-M (e.g., in a multi-plane page programming process). As an example, a multi-plane page programming process can include sequentially loading data to data registers (not shown) for each of a number of planes and then programming the loaded data to the appropriate planes of a particular parity stripe 121 simultaneously. The parity engine 119 can be used to determine (e.g., compute) parity data for data (e.g., user data) corresponding to parity stripes 121. The parity data is derived from the data it protects. That is, parity data for each particular parity stripe 121 is computed responsive to the user data to be programmed to the stripe 121. As such, in embodiments in which the data registers are sequentially loaded, the parity data is loaded after the user data.

As described further herein, a parity stripe 121 can include a group of physical blocks from each of a number of different planes across a number of memory units 115-1, . . . , 115-M. The parity stripe 121 can include a number of parity blocks associated therewith, with each parity block corresponding to a subset of blocks from the group. Each subset of blocks can include a block from a particular plane of each of a number of memory units associated with the parity stripe. For instance, a first subset of blocks can include a block from a first plane of each of a number of memory units, and a second subset of blocks can include a block from a second plane of each of the number of memory units, and so on. The determined location within the group of blocks for the parity blocks corresponding with each respective subset of blocks can be determined in accordance with embodiments described below in connection with FIGS. 2-4B.

Figure 2:
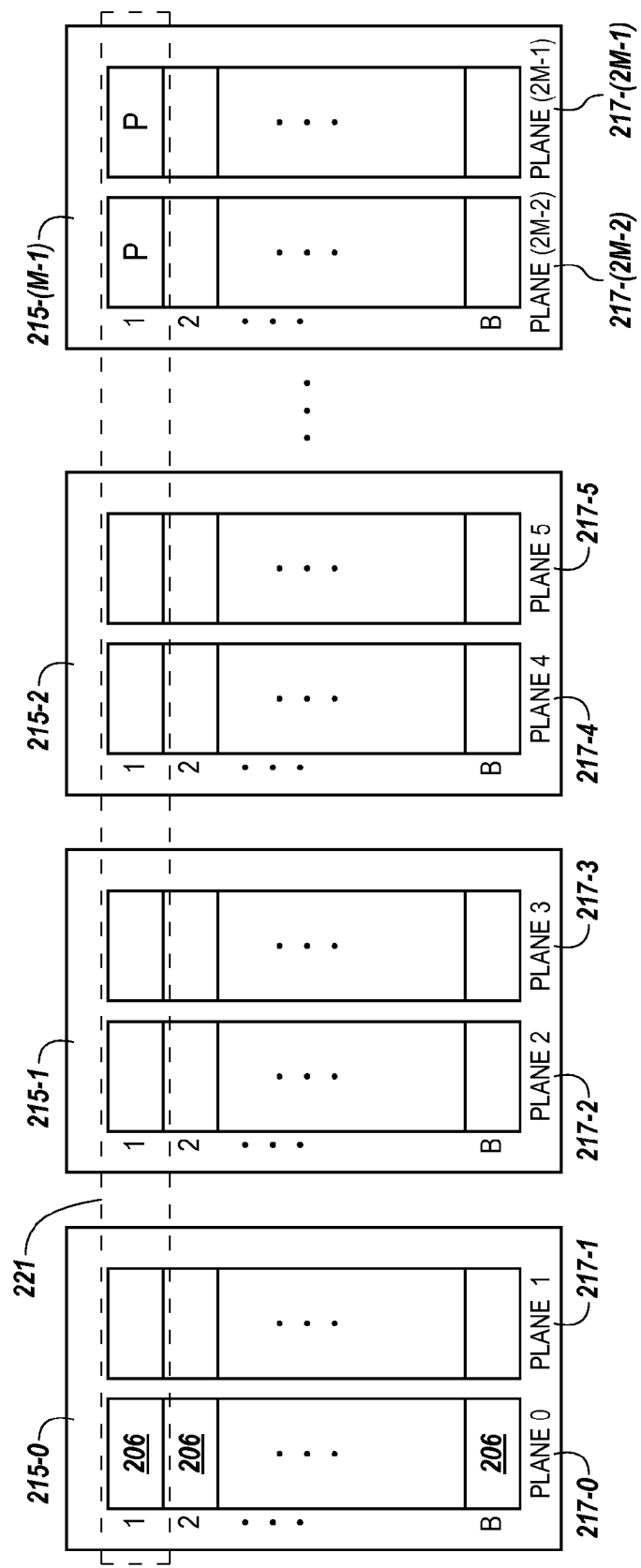
FIG. 2 illustrates a block diagram of a portion of a memory system in accordance with one or more embodiments of the present disclosure.

FIG. 2 illustrates a block diagram of a portion of a memory system (e.g., memory system 104 described in FIG. 1) in accordance with one or more embodiments of the present disclosure. FIG. 2 illustrates a parity stripe 221 across a number of memory units 215-0, 215-1, 215-2, . . . , 215-(M−1).

In this example, the memory units 215-0, 215-1, 215-2, . . . , 215-(M−1) each include two planes of physical blocks 206, with each plane including B blocks 206. Accordingly, the parity stripe 221 has 2M−1 planes associated therewith (e.g., 217-0, 217-1, 217-2, 217-3, 217-4, 217-5, . . . , 217-(2M−2), 217-(2M−1)). That is, the parity stripe 221 includes a physical block 206 from each of planes 217-0, 217-1, 217-2, 217-3, 217-4, 217-5, . . . , 217-(2M−2), 217-(2M−1) across the memory units 215-0, 215-1, 215-2, . . . , 215-(M−1).

In the example illustrated in FIG. 2, the parity stripe 221 includes a parity block ("P") corresponding to each of two subsets of blocks 206. In this example, a first subset includes a physical block 206 from each of the even planes (e.g., 217-0, 217-2, 217-4, . . . , 217-(2M−2) across the memory units 215-0, 215-1, 215-2, . . . , 215-(M−1), and a second subset includes a physical block 206 from each of the odd planes (e.g., 217-1, 217-3, 217-5, . . . , 217-(2M−1) across the memory units 215-0, 215-1, 215-2, . . . , 215-(M−1). The remaining physical blocks 206 of stripe 221 (e.g., the blocks other than the parity blocks) can have user data written thereto and can be referred to as target blocks. In this example, the parity block P from plane 217-(2M−2) can have parity data, which corresponds to the target blocks 206 from the even planes, written thereto. Similarly, the parity block P from plane 217-(M−1) can have parity data, which corresponds to the target blocks 206 from the odd planes, written thereto.

Providing a parity block in association with subsets of blocks corresponding to each of a respective number of subsets of planes across the memory units 215-0, 215-1, 215-2, . . . , 215-(M−1) can provide benefits such as preventing the loss of multiple elements (e.g., blocks) of a parity stripe due to a die failure, for instance. In some instances, the loss of multiple elements of a parity stripe can result in an inability to recreate the data of the stripe using the parity data of the parity block corresponding to the parity stripe. For example, the user data of the parity stripe may be lost if more than a threshold number of the target blocks of the parity stripe become unusable.

There are instances in which one or more blocks 206, planes 217-0, 217-1, 217-2, 217-3, 217-4, 217-5, . . . , 217-(2M−2), 217-(2M−1), and/or memory units 215-0, 215-1, 215-2, . . . , 215-(M−1) associated with a parity stripe (e.g., parity stripe 221) may be unusable, may fail, and/or may become unusable. As an example, various blocks 206 within the memory units 215-0, 215-1, 215-2, . . . , 215-(M−1) may be bad blocks. A bad block can refer to a block that is, or has become, unreliable and/or unusable. As such, bad blocks do not contribute to a parity stripe (e.g., parity stripe 221) either as target blocks or parity blocks. As described further herein, in various embodiments, data regarding bad block locations across the memory units 215-0, 215-1, 215-2, . . . , 215-(M−1) can be maintained (e.g., stored) in the memory system. As an example, the good/bad block data can be stored in an array (e.g. array 330 described in FIG. 3).

Figure 3:
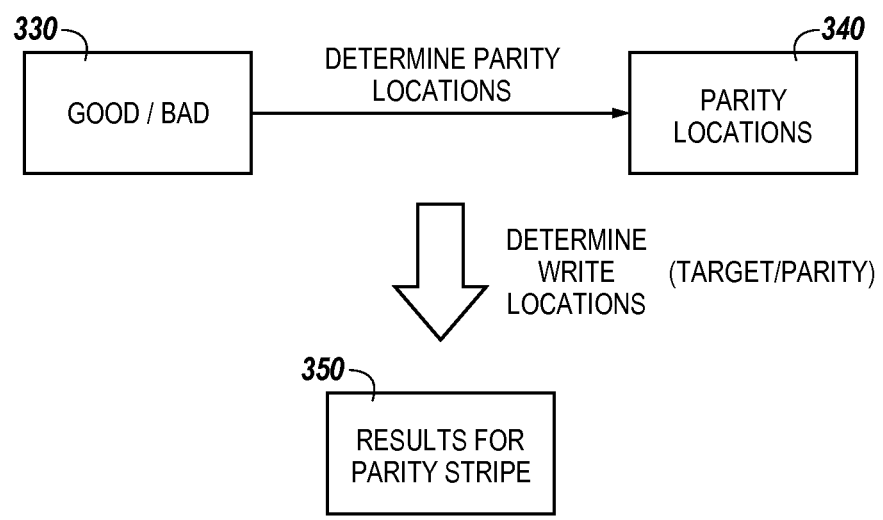
FIG. 3 illustrates a functional block diagram of a method for determining parity locations in accordance with one or more embodiments of the present disclosure.

FIG. 3 illustrates a functional block diagram of a method for determining parity locations in accordance with one or more embodiments of the present disclosure. In FIG. 3, block 330 (GOOD/BAD) represents a data structure such as an array, for example, that includes data regarding good/bad blocks. Array 330 can indicate the locations of bad blocks across each of the number of memory devices (e.g., memory devices 110-1, 110-2, . . . , 110-X shown in FIG. 1) and memory units (e.g., memory units 215-0, 215-1, 215-2, . . . , 215-(M−1) shown in FIG. 2) of a memory system (e.g., memory system 104 shown in FIG. 1). As such, the array 330 can indicate the locations of bad blocks among groups of blocks associated with parity stripes (e.g., parity stripe 221 shown in FIG. 2).

As illustrated in FIG. 3 and described further below in connection with FIGS. 4A and 4B, the good/bad block data 330 can be used to determine the location of parity blocks within a group of blocks associated with a parity stripe. The parity block location data can be stored by the memory system in a data structure such as an array 340 (PARITY LOCATIONS), as shown in FIG. 3.

In one or more embodiments, and as described further below in connection with FIGS. 4A and 4B, the good/bad block location data 330 and determined parity block location data 340 can be used to determine write locations within the particular parity stripe. That is, the arrays 330 and 340 can be used to determine which blocks from the group of blocks associated with a parity stripe are to receive user data (e.g., which blocks are target blocks) and which blocks from the group of blocks associated with the parity stripe are to receive parity data (e.g., which blocks are parity blocks used to receive parity data corresponding to a particular subset of target blocks).

As illustrated in FIG. 3, one or more embodiments can include a results array 350 (RESULTS FOR PARITY STRIPE) that stores data corresponding to the target block locations and associated parity block locations for a parity stripe. In various embodiments, the data in the results array 350 can be stored in cache memory and can be reused across all of the pages associated with a particular parity stripe. For instance, a block of memory cells can have a number (e.g., 64, 128, 256, 512, etc.) of physical pages storable therein. Since data (e.g., user data and parity data) is written to the blocks of a parity stripe a page at a time, the data provided by results array 350 can be used multiple times for a particular parity stripe. The data provided in results array 350 can be used by write logic of the memory system to provide appropriate commands to an error detection engine (e.g., parity engine 119 shown in FIG. 1) used to compute parity data to be written to the parity blocks corresponding to the parity stripe. The number of pages associated with a block of memory cells can depend on various factors such as page size or number of bits storable per cell, among other factors.

Figure 4A:
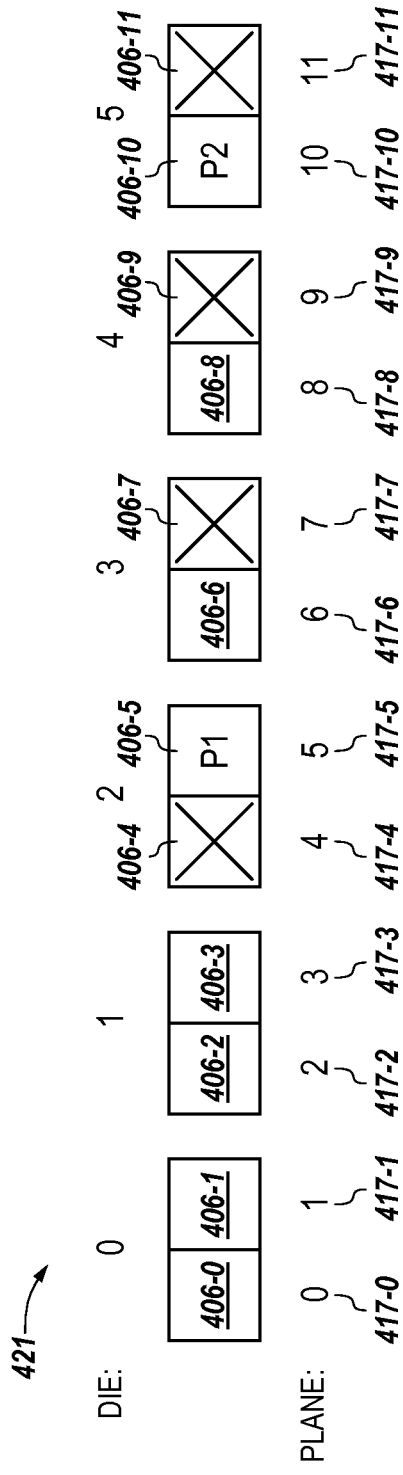
FIG. 4A illustrates a parity stripe in accordance with one or more embodiments of the present disclosure.

FIG. 4A illustrates a parity stripe 421 in accordance with one or more embodiments of the present disclosure. FIG. 4B illustrates a number of data structures associated with determining parity location for the parity stripe 421 shown in FIG. 4A in accordance with one or more embodiments of the present disclosure.

In the example illustrated in FIG. 4A, the parity stripe 421 includes a group of physical blocks 406-0, 406-1, . . . , 406-11 across a number of memory units (e.g., dies). In this example, the number of memory units is six (labeled 0 to 5) and each memory unit includes two planes such that the parity stripe 421 has twelve planes (labeled 0 to 11) associated therewith. Embodiments are not limited to this example. In one or more embodiments, "N" can represent the number of planes associated with each of the number of memory units associated with a parity stripe. Embodiments are not limited to memory units having two planes associated therewith (e.g., N=2). That is, in one or more embodiments, N can be more than two (e.g., N can be 3 or 4, among other numbers of planes per memory unit). Also, parity stripes in accordance with embodiments described herein can have more or fewer than twelve blocks associated therewith.

In one or more embodiments, each of a number of subsets of blocks from the group of blocks associated with a parity stripe has a parity block associated therewith. The number of subsets of blocks associated with a parity stripe can be the same as the number of planes per memory unit, in one or more embodiments. For instance, in this example N=2. As such, the group of blocks 406-0, 406-1, . . . , 406-11 are dived into 2 subsets of blocks (e.g., as each memory unit includes 2 planes). In this example, a first subset of blocks includes the blocks from the odd numbered planes (417-1, 417-3, 417-5, 417-7, 417-9, and 417-11) across the memory units (e.g., blocks 406-1, 406-3, 406-5, 406-7, 406-9, and 406-11). A second subset of blocks includes the blocks from the even numbered planes (417-0, 417-2, 417-4, 417-6, 417-8, and 417-10) across the memory units (e.g., blocks 406-0, 406-2, 406-4, 406-6, 406-8, and 406-10). In one or more embodiments, a page of data can be simultaneously written to the blocks of each respective subset of blocks in a multi-plane page programming process, for instance.

One or more embodiments of the present disclosure include determining, for each of the subsets of blocks from the group (e.g., for the subset of blocks corresponding to the odd planes and the subset of blocks corresponding to the even planes, in this example), a location of a parity block within a respective subset. In this example, block 406-5 is determined to be the parity block (labeled P1) for the subset of blocks corresponding to the odd planes 417-1, 417-3, 417-5, 417-7, 417-9, and 417-11 and block 406-10 is determined to be the parity block (labeled P2) for the subset of blocks corresponding to the even planes 417-0, 417-2, 417-4, 417-6, 417-8, and 417-10.

In various instances, it can be beneficial for a parity block of a particular subset of blocks associated with a parity stripe to be located at a last (e.g., end) block position of the subset such as to enable increased bandwidth associated with multi-plane programming, for instance, among other benefits. As another example, in implementations in which data registers (e.g., buffers) and/or parity registers are loaded sequentially, it can be a constraint of the writing mechanism of the memory system for the parity block to be physically located at a block position after the target blocks of the subset which are protected by the parity block.

As used herein, "block position" refers to a logical location of a physical block, with respect to other physical blocks, within a group of blocks associated with a parity stripe. For example, in FIG. 3, block 406-0 is located at a first block position among the group of blocks 406-0, 406-1, . . . , 406-11, while block 406-11 is locate at a last block position among the group of blocks 406-0, 406-1, . . . , 406-11 associated with parity stripe 421. As another example, block 406-1 is located at a first block position with respect to the subset of blocks 406-1, 406-3, 406-5, 406-7, 406-9, and 406-11 associated with the odd numbered planes 417-1, 417-3, 417-5, 417-7, 417-9, and 417-11, and block 406-0 is located at a first block position with respect to the subset of blocks 406-0, 406-2, 406-4, 406-6, 406-8, and 406-10 associated with the even numbered planes 417-0, 417-2, 417-4, 417-6, 417-8, and 417-10. Similarly, block 406-11 is located at a last block position with respect to the subset of blocks 406-1, 406-3, 406-5, 406-7, 406-9, and 406-11 associated with the odd numbered planes 417-1, 417-3, 417-5, 417-7, 417-9, and 417-11, and block 406-10 is located at a last block position with respect to the subset of blocks 406-0, 406-2, 406-4, 406-6, 406-8, and 406-10 associated with the even numbered planes 417-0, 417-2, 417-4, 417-6, 417-8, and 417-10. In the example shown in FIG. 4A, the physical plane positions coincide with the physical block positions. For instance, block 406-0 is located at block position 0 ("BP0") and coincides with plane 417-0 located at plane position ("0"), block 406-1 is located at BP1 and coincides with plane 417-1 at plane position ("1"), etc.

In one or more embodiments of the present disclosure, the location of a parity block (e.g., block 406-5 (P1) and 406-10 (P2)) within a respective subset of blocks can be determined based, at least partially, on the location of bad blocks within the subset. For instance, blocks determined to be bad blocks are not used as target blocks (e.g., blocks to receive user data) or as parity blocks (e.g., blocks storing parity data corresponding to target blocks of the subset). As such, if a block located at a last block position of a subset is determined to be a bad block, then it is desirable to use a different block within the particular subset as the parity block for the subset.

In one or more embodiments, determining the location of a parity block within a particular subset of blocks associated with a parity stripe includes determining whether a block located at a last block position of the subset is a bad block. The determination can be made, for example, by checking an array of good/bad block data, such as array 330 shown in FIG. 3 or array 430 described in connection with FIG. 4B. If the block located at the last block position is not a bad block, then that block can be used as the parity block for the subset. However, if the block located at the last block position is a bad block, then the block located at a next to last block position of the subset is checked to determine whether it is a bad block. In various embodiments, the next to last block position is determined by subtracting N from the last block position, where "N" corresponds to the number of planes per memory unit and the number of subsets of blocks associated with the parity stripe (N=2 in the example shown in FIG. 4A). Hence, if the block located at the last block position minus N is determined to be a good block, then that block is used as the parity block for the subset. If the block located at the last block position minus N is a bad block, then N can be subtracted from the current block position and the block at that block position can undergo a good/bad test. The above process can be continued until a good block is found, and the good block can be used as the parity block for the subset. The above described process can be repeated for each of the number of subsets of blocks associated with the parity stripe (e.g., parity stripe 421), such that each of the subsets includes a parity block associated therewith.

As an example, the location of the parity block P1 (406-5) corresponding to a first subset of blocks 406-1, 406-3, 406-5, 406-7, 406-9, 406-11 from the group of blocks associated with the parity stripe 421 and the location of the parity block P2 (406-10) corresponding to a second subset of blocks 406-0, 406-2, 406-4, 406-6, 406-8, 406-10 from the group of blocks associated with the parity stripe 421 can be determined as follows. In this example, the number of subsets of blocks associated with the parity stripe 421 is two, which corresponds to the number (N) of planes per die (e.g., N=2).

In order to determine the location of a parity block, P1, associated with the first subset of blocks 406-1, 406-3, 406-5, 406-7, 406-9, 406-11, the block located at the last block position of the first subset (e.g., block 406-11) is considered first. In this example, block 406-11 is a bad block (as indicated by "X" in FIG. 4A). The determination of whether block 406-11 is a bad block can be based on data stored in a data structure such as GOOD(G)/BAD(B) array 430 shown in FIG. 4B. The array 430 provides an indication of whether each of the blocks within the group of blocks associated with parity stripe 421 is good block (G) or a bad block (B). In this example, the array 430 indicates that the block located at block position 11 (BP11) (e.g., block 406-11) is a bad block. Since, block 406-11 is a bad block, N (e.g., 2 in this example) is subtracted from the last block position and it is determined whether the block at the last block position minus N (e.g., block 406-9 located at BP9) is a bad block. As indicated by array 430, the block located at BP9 (e.g., block 406-9) is also a bad block. As such, N is subtracted from the block position of block 406-9 and it is determined whether the block located at BP7 (e.g., block 406-7) is a bad block. As indicated by array 430, the block located at BP7 (e.g., block 406-7 is also a bad block. As such, N is subtracted from the block position of block 406-7 and it is determined whether the block located at BP5 (e.g., block 406-5) is a bad block. As indicated by array 430, the block located at BP5 (e.g., block 406-5) is a good block. As such, block 406-5 is used as the parity block P1 for the first subset of blocks associated with parity stripe 421.

In order to determine the location of a parity block, P2, associated with the second subset of blocks 406-0, 406-2, 406-4, 406-6, 406-8, 406-10, the block located at the last block position of the second subset (e.g., block 406-10) is considered first. In this example, block 406-10 is a good block. As described above, the determination of whether block 406-10 is a bad block can be based on data stored in a data structure such as GOOD(G)/BAD(B) array 430 shown in FIG. 4B. In this example, the array 430 indicates that the block located at block position 10 (BP10) (e.g., block 406-10) is a good block. Since, block 406-10 is a good block, block 406-10 is used as the parity block P2 for the second subset of blocks associated with parity stripe 421.

In one or more embodiments, the locations of the parity blocks P1 (e.g., block 406-5) and P2 (e.g., block 406-10) can be stored in a data structure such as a parity array 440 illustrated in FIG. 4B. The size of the parity array 440 can be equal to the number (N) of planes per memory unit (e.g., N=2 in this example).

In one or more embodiments, and as illustrated in FIG. 4A, each of the subsets of blocks associated with parity stripe 421 include a number of target blocks. The target blocks within each respective subset can receive user data, which is protected by parity data that can be written to the respective parity block for the subset. As such, the target blocks of each respective subset are good blocks and have a block position ahead of the parity block corresponding to the subset. In this example, the target blocks corresponding to the first subset of blocks 406-1, 406-3, 406-5, 406-7, 406-9, 406-11 include block 406-1 at block position BP1 and block 406-3 at block position BP3. The parity block 406-5 (P1) is located at a block position BP5, which is after BP1 and BP3. Also, the target blocks corresponding to the second subset of blocks 406-0, 406-2, 406-4, 406-6, 406-8, 406-10 include block 406-0 at block position BP0, block 406-2 at block position BP2, block 406-6 at block position 6, and block 406-8 at block position BP8. The parity block 406-10 (P2) is located at block position BP10, which is after BP0, BP2, BP6, and BP8.

In one or more embodiments, the data from the parity stripe 421 (e.g., the block positions of the target blocks and corresponding parity block for each respective subset) can be used to write user data and corresponding parity data to the appropriate locations across the number of memory units (e.g., in stripes). As an example, a data structure such as RESULTS array 450 can be used to store the locations of the target blocks and parity blocks associated with stripe 421. Write logic of the memory system can use the results array 450 to provide appropriate commands to one or more parity engines (e.g., parity engine 119 shown in FIG. 1), which can be used to determine (e.g., calculate) parity data corresponding to user data to be written to particular target blocks of the respective subsets associated with stripe 221.

As illustrated by parity stripe 421 in FIG. 4A, one or more embodiments of the present disclosure can include writing valid user data to a target block of a subset which has a block position located after a block position of the parity block of at least one of the other subsets of blocks from the group of blocks associated with the parity stripe. For instance, in the example shown in FIG. 4A, valid data can be written to target blocks 406-6 and 406-8 of the second subset of blocks, which are located after the block position of the parity block 406-5 corresponding to the first subset of blocks.

In one or more embodiments, the data in results array 450 can be determined based on the data in the good/bad array 430 and the parity array 440. For example, a list of in order target blocks for user data can be produced by traversing the good/bad array 430 (e.g., starting at block position BP0) and emitting (e.g., producing) a list of only good blocks associated with the group of blocks of stripe 421. Prior to a good block being emitted, the block can be compared against the first element in the parity array 440 (which can be sorted from smallest block position to largest as shown in FIG. 4B). If the block position of the good block matches the block position of the first element of the parity array, a parity block position marker can be emitted and subsequent comparisons can be done against the next element in the parity array. The locations of each of the target blocks among the group of blocks associated with stripe 421 have been emitted when the block position within the good/bad array 430 matches the block position of the final element in the parity array 440. The final (e.g., second, in this example) parity block position marker can then be emitted to complete the entries in the results array 450.

The results array 450 shown in Figure B indicates the block positions (BPs) of the target blocks and the parity blocks corresponding to each of the two subsets of blocks associated with parity stripe 421, as determined based on the good/bad array 430 and parity array 440. Parity stripe 421 shown in FIG. 4B indicates user data (e.g., DATA1) written to the target blocks of the first subset of blocks (e.g., blocks at BP1 and BP3) as well as parity data (e.g., P1) written to the corresponding parity block (e.g., the block at BP5) of the first subset. Parity stripe 421 of FIG. 4B also indicates user data (e.g., DATA2) written to the target blocks of the second subset of blocks (e.g., blocks at BP0, BP2, BP6, and BP8) as well as parity data (e.g., P2) written to the corresponding parity block (e.g., the block at BP10).

FIG. 4B also illustrates an example of commands that can be provided to an error detection engine (e.g., parity engine 119 shown in FIG. 1) of a memory system in conjunction with determining error detection data (e.g., parity data) in accordance with one or more embodiments described herein. For instance, with respect to the first subset of blocks associated with stripe 421 (e.g., blocks at odd block positions), and starting at a first block position of the subset (e.g., BP1), a START command 450-1 can be provided to the parity engine. As illustrated in FIG. 4B, a COMPUTE command can be provided to the parity engine. Responsive to a COMPUTE command, the parity engine can determine parity data based on particular user data loaded in a parity buffer and to be written to target blocks of the subset. In association with the first subset, the parity engine computes parity data corresponding to the particular user data (e.g., DATA1) associated with the blocks at BP1 and BP3 responsive to COMPUTE command 452-1. Since the next block in the first subset (e.g., the block at BP5) is the parity block for the subset, a WRITE command 460-1 is provided to the parity engine and the previously computed parity data P1 (e.g., the parity data corresponding to the user data DATA1 associated with the blocks at BP1 and B3) is written to the parity block at BP5 within stripe 421.

With respect to the second subset of blocks associated with parity stripe 421 (e.g., blocks at even block positions), and starting at a first block position of the subset (e.g., BP0), a START command 450-2 can be provided to the parity engine. Responsive to COMPUTE command 452-2, the parity engine can compute parity data corresponding to the particular user data (e.g., DATA2) associated with the blocks as BP0 and BP2. Since the block at the next block position of the subset (e.g., the block at BP4) is a bad block, a SKIP command 453-2 can be provided to the parity engine. A skip command in association with a particular block position can indicate that a parity computation is not required for that block position. Since the block at the next block position of the subset (e.g., the block at BP6) is a target block, the parity engine can compute parity data corresponding to the particular user data (e.g., DATA2) associated with the blocks at BP0, BP2, and BP6, responsive to COMPUTE command 454-2. Also, since the block at the next block position of the subset (e.g., the block at BP8) is a target block, the parity engine can compute parity data corresponding to the particular user data (e.g., DATA2) associated with the blocks at BP0, BP2, BP6, and BP8, responsive to COMPUTE command 456-2. Since the next block in the second subset (e.g., the block at BP10) is the parity block for the subset, a WRITE command 460-2 is provided to the parity engine and the previously computed parity data (e.g., the parity data corresponding to the user data DATA2 associated with the blocks at BP0, BP2, BP6, and BP8) P2 is written to the parity block at BP10 within stripe 421.

In one or more embodiments, a separate parity engine can be associated with each of the number of subsets of blocks. For instance, a first parity engine can be associated with the blocks at odd block positions and a second parity engine can be associated with the blocks at even block positions.

In various instances, blocks, planes, dies, and/or chips associated with a memory system can become bad over time. As such, in some instances, a block or blocks of a group of blocks associated with a parity stripe (e.g., parity stripe 421) can become bad subsequent to production of the stripe. In one or more embodiments, if it is determined that a block associated with a parity stripe has become a bad block, the block can be marked as bad such that it no longer participates in the stripe (e.g., the bad block does not receive user data or parity data). If the block that has become bad was used as a parity block, then a replacement parity block is determined. In one or more embodiments, the replacement parity block can be determined by subtracting the number of planes per die (e.g., "N" as described above) from the block position of the bad parity block and, responsive to a determination that the block at that block position is a good block, assigning that block to be the replacement parity block. The block determined to be a bad block subsequent to the production of the parity stripe is also removed from the parity array (e.g., 440) and the results array (e.g., 450).

CONCLUSION

The present disclosure includes methods and systems for determining location of error detection data. One method for operating a memory unit having a bad group of memory cells includes determining a location of where to store error detection data for data to be stored across a plurality of memory units, including the memory unit having the bad group, based at least partially on a location of the bad group and storing the error detection data in the determined location.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

As used herein, the term "and/or" includes any and all combinations of one or more of the associated listed items. As used herein the term "or," unless otherwise noted, means logically inclusive or. That is, "A or B" can include (only A), (only B), or (both A and B). In other words, "A or B" can mean "A and/or B" or "one or more of A and B."

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for operating a memory unit having a bad group of memory cells, the method comprising:
    determining a location for storing error detection data for data to be stored across a plurality of memory units, including the memory unit having the bad group, based at least partially on a location of the bad group, wherein the bad group has a particular index corresponding thereto; and
    storing the error detection data in the determined location;
    wherein the plurality of memory units each comprise N planes, and wherein determining the location for storing error detection data includes:
        determining whether a first group of memory cells having a corresponding index equal to the particular index minus N is a bad group;
        responsive to a determination that the first group of memory cells having the corresponding index equal to the particular index minus N is not a bad group, using the first group as the location for storing the error detection data; and
        responsive to a determination that the first group of memory cells having the corresponding index equal to the particular index minus N is a bad group, determining whether a second group of memory cells having a corresponding index equal to the particular index minus 2N is a bad group.

2. The method of claim 1, wherein the bad group of memory cells comprises a bad block of memory cells.

3. The method of claim 1, wherein determining a location for storing error detection data includes determining a location for storing parity data.

4. The method of claim 3, wherein determining a location for storing parity data includes determining a location of a parity block of memory cells.

5. The method of claim 1, wherein determining a location for storing error detection data for data to be stored across a plurality of memory units includes determining a location for storing error detection data for a stripe of data.

6. The method of claim 1, wherein each of the memory units includes a first plane of memory cell blocks and a second plane of memory cell blocks.

7. The method of claim 6, wherein the bad group is located in the first plane of one of the memory units and wherein determining a location for storing error detection data includes determining a location within the first plane of one of the other memory units.

8. The method of claim 6, wherein the bad group is located in the second plane of one of the memory units and wherein determining a location for storing error detection data includes determining a location within the second plane of one of the other memory units.

9. The method of claim 1, wherein a memory unit M of the plurality of memory units is a last memory unit of the plurality of memory units, and wherein the first group of memory cells is located in the memory unit M.

10. The method of claim 9, wherein the second group of memory cells is located in a memory unit M-1 of the plurality of memory units.

11. The method of claim 1, wherein a bad group of memory cells comprises a group of memory cells that have been determined to be unreliable.

12. The method of claim 1, wherein a bad group of memory cells comprises a group of memory cells that have been determined to be unusable.

13. The method of claim 1, wherein the error detection data for data comprises error detection data for user data, and further including storing the user data prior to storing the error detection data.

14. The method of claim 1, wherein determining a location for storing error detection data for data to be stored across a plurality of memory units includes determining, for each of a number of subsets of groups of memory cells, a respective location for storing error detection data for data to be stored in the respective subset of groups.

15. A memory controller configured to:
determine a location for storing error detection data for data to be stored across a plurality of memory units, including a memory unit having a bad group, based at least partially on a location of the bad group, wherein the bad group has a particular index corresponding thereto; and
store the error detection data in the determined location;
wherein the plurality of memory units each comprise N planes, and wherein the memory controller is further configured to determine the location for storing error detection data for data to be stored across a plurality of memory units by:
determining whether a first group of memory cells having a corresponding index equal to the particular index minus N is a bad group;
responsive to a determination that the first group of memory cells having the corresponding index equal to the particular index minus N is not a bad group, using the first group as the location for storing the error detection data and
responsive to a determination that the first group of memory cells having the corresponding index equal to the particular index minus N is a bad group, determining whether a second group of memory cells having a corresponding index equal to the particular index minus 2N is a bad group.

16. The memory controller of claim 15, wherein a memory unit M of the plurality of memory units is a last memory unit of the plurality of memory units, and wherein the first group of memory cells is located in the memory unit M.

17. A memory controller configured to:
determine, for a group of blocks of memory cells associated with a parity stripe across a number of memory units, a number of target blocks to receive user data and a number of parity blocks to receive parity data corresponding to the user data by:
producing a first array including elements indicating a parity block position for each of a number of subsets of blocks from the group of blocks based on data from a second array having elements indicating a good/bad status for the blocks at each block position of the group;
producing a third array having elements indicating in order block positions of the number of target blocks for each of the number of subsets by:
starting at a first element of the second array, comparing each element corresponding to a good block of the second array to at least one element of the first array and:
adding the good block to the third array if a block position of the good block does not match a parity block position associated with the at least one element of the first array; and
adding a parity marker to the third array if the block position of the good block matches a parity block position associated with the at least one element of the first array.

* * * * *